(12) United States Patent
Char et al.

(10) Patent No.: US 11,579,056 B2
(45) Date of Patent: Feb. 14, 2023

(54) UNIVERSAL MATERIAL TESTER WITH SEVERAL CONSECUTIVELY ARRANGED TEST UNITS

(71) Applicants: Gautam Char, San Jose, CA (US); Nick Doe, San Jose, CA (US); Vishal Khosla, San Jose, CA (US); Ming Chan, San Jose, CA (US); Michael Vinogradov-Nurenberg, San Jose, CA (US); Jun Xiao, San Jose, CA (US)

(72) Inventors: Gautam Char, San Jose, CA (US); Nick Doe, San Jose, CA (US); Vishal Khosla, San Jose, CA (US); Ming Chan, San Jose, CA (US); Michael Vinogradov-Nurenberg, San Jose, CA (US); Jun Xiao, San Jose, CA (US)

( * ) Notice: Subject to any disclaimer, the term of this patent is extended or adjusted under 35 U.S.C. 154(b) by 381 days.

(21) Appl. No.: 16/902,781

(22) Filed: Jun. 16, 2020

(65) Prior Publication Data
US 2021/0389218 A1  Dec. 16, 2021

(51) Int. Cl.
*G01N 3/04*  (2006.01)
*G01N 3/40*  (2006.01)
*G01N 3/56*  (2006.01)

(52) U.S. Cl.
CPC ............... *G01N 3/04* (2013.01); *G01N 3/40* (2013.01); *G01N 3/56* (2013.01)

(58) Field of Classification Search
CPC ........................................................ G01N 3/04
USPC ................................................................ 73/7
See application file for complete search history.

(56) References Cited

U.S. PATENT DOCUMENTS

| 6,332,364 B1 | 12/2001 | Buschmann et al. |
| 7,243,554 B2 | 7/2007 | Wenski |
| 8,770,036 B2 | 8/2014 | Vodnik et al. |
| 10,132,733 B2 | 11/2018 | Vinogradov-Nurenberg |
| 2013/0147939 A1* | 6/2013 | Nawata ............... G02B 21/365 348/79 |
| 2017/0067735 A1* | 3/2017 | Khosla .................. G01N 3/068 |

\* cited by examiner

*Primary Examiner* — Walter L Lindsay, Jr.
*Assistant Examiner* — Philipmarcus T Fadul

(57) ABSTRACT

A universal material tester with two or more consecutively arranges test units has a test tool supporting carriage, which is provided with a removable partition that allows conversion of the test-unit installation socket from a multiple test unit holder into a single test-unit holder, or vice versa. An advantage of the tester is a possibility of expanding dynamic range of measurements by using two or more test units, which are installed in series at one setting and can be used in sequential tests without replacement but with different measurement ranges. This broadens the dynamic measurement ranges and allows revealing material properties otherwise unattainable. The test units may be combined with an imaging device installed in series with the test tools that engage the sample physically.

16 Claims, 8 Drawing Sheets

UNIVERSAL MATERIAL TESTER WITH SEVERAL CONSECUTIVELY ARRANGED TEST UNITS

FIELD OF THE INVENTION

The present invention relates to the field of testing properties of various materials such as hardness, friction characteristics, resistance to wear and scratching, etc. In particular, the invention relates to universal material testers, especially those having replaceable and consecutively arranged test/measurement units such as load cells for testing mechanical properties and/or optical heads for aligning or imaging.

DESCRIPTION OF THE PRIOR ART

There exists a variety of universal material testers for testing properties of various materials with the use of replaceable test tools and/or imaging units.

For example, U.S. Pat. No. 6,332,364B1 issued on Dec. 25, 2001 to Buschmann, et al., discloses a universal material testing device, which includes: a frame; an actuator mounted on the frame for controlling a displacement of a sample to be tested and a replaceable load cell movably mounted on the frame and adapted to abut against the sample for detecting a force applied thereon by the actuator and producing a signal corresponding to the force detected; a signal conditioning unit for reducing input noise and for processing of the signal and executing specific tests by coordination of displacement control and load signals received for processing from the load cell; and a detachable chamber with humidifying media for humidification of the sample environment confined within the chamber and separated from the sample so as to avoid potential damaging effects of humidity on the sample or on the device. The device is useful for determining certain material properties of a sample.

U.S. Pat. No. 7,243,554B2 issued on Jan. 19, 2006 to E. Wenski discloses a micro-tensile testing system providing a stand-alone test platform for testing and reporting physical or engineering properties of test samples of materials having thicknesses of approximately between 0.002 inch and 0.030 inch, including, for example, LiGA engineered materials. The testing system is able to perform a variety of static, dynamic, and cyclic tests. The testing system includes a rigid frame and adjustable gripping supports to minimize measurement errors due to deflection or bending under load; serrated grips for securing the extremely small test sample; high-speed laser scan micrometers for obtaining accurate results; and a test software for controlling the testing procedure and reporting results. The tester uses interchangeable load cells.

U.S. patent Ser. No. 10/132,733 issued on Nov. 20, 2018 to Michael Vinogradov-Nurenberg, et al. discloses a universal mechanical tester for measuring friction and wear characteristics of materials. The tester consists of a frame that supports a carriage moveable in a vertical direction, a force sensor assembly attached to the carriage, a positioning stage with a slide and a platform, and a plurality of modular sample stages interchangeably installable on the platform for executing linear and rotary motions of the lower sample relative to the upper sample in various directions and planes. The tester is provided with a set of electronic identification devices for identifying a modular sample stage installed on the platform and the force sensor assembly attached to the carriage.

U.S. Pat. No. 8,770,036B2 issued on Jul. 8, 2014 to David Vodnik, et al. discloses an automated testing system that facilitates inline production testing of samples at a micro (multiple microns) or less scale with a mechanical testing instrument. In an example, the system includes a probe changing assembly for coupling and decoupling a probe of the instrument. The probe changing assembly includes a probe change unit configured to grasp one of a plurality of probes in a probe magazine and couple one of the probes with an instrument probe receptacle. An actuator is coupled with the probe change unit, and the actuator is configured to move and align the probe change unit with the probe magazine and the instrument probe receptacle. In another example, the automated testing system includes a multiple degree of freedom stage for aligning a sample testing location with the instrument. The stage includes a sample stage and a stage actuator assembly including translational and rotational actuators.

SUMMARY OF THE INVENTION

A common disadvantage of all existing universal material testers with replaceable test tools or imaging units is that on each test/imaging operation they allow insertion and use of only one test tool working in a predetermined range of operation parameters and that for carrying out another test with the test tool of the same or different type but working in a different range of predetermined parameters, a new test tool must be inserted into the same test unit.

According to the present invention, the proposed universal material tester has a test tool supporting carriage, which is provided with a removable partition that allows conversion of the test-unit installation socket from a multiple test unit holder into a single test-unit holder, or vice versa.

An advantage of the apparatus and method of the present invention is a possibility of expanding dynamic range of measurements by using two or more test units, which are installed in series at one setting and can be used at sequential tests without replacement but with different measurement ranges. This broadens the measurement ranges of a specific test and compare and analyze the obtained data without loss of time which otherwise has to be spent on the tool replacement. A provision of two preinstalled test units also makes it possible to combine various working tools with imaging units without time-consuming replacements and even to test and reveal material properties otherwise unattainable. For example, a first test tool may be comprised of nano-scratch test unit and the second test tool may be comprised of a micro-scratch test unit. The test units may also be represented by load cells, hardness-measuring tips, etc. The test units should have identical attachment devices for inserting and securing them in the aforementioned installation sockets.

The use of two replaceable partitions makes it possible to form three installation sockets for installation of two consecutive test units with different ranges of measurement, and the third unit may be represented by an optical head that can be used for alignment or for imaging of the scratched or otherwise treated surface.

Similar to U.S. patent Ser. No. 10/132,733, the universal material tester of the invention with replaceable test units is intended for measuring friction and wear characteristics of materials and structurally consists of a frame that supports a test-unit holding carriage moveable in a vertical direction, a test unit assembly attached to the carriage, a positioning stage with a slide and a platform for a test specimen, and a plurality of modular specimen stages interchangeably installable on the platform for executing linear and rotary motions of the specimen relative to the upper carriage in various directions and planes. The tester is provided with a set of electronic identification devices for identifying a modular sample stage installed on the platform of the base.

BRIEF DESCRIPTION OF THE DRAWINGS

FIGS. 6A, 68, 6C are examples of test units with test tools inserted into the test units, wherein FIG. 6A illustrates a first scratch test unit with a first scratch probe, FIG. 6C shows an optical head with an objective.

DETAILED DESCRIPTION OF THE INVENTION

The present invention relates to the field of testing properties of various materials such as hardness, friction characteristics, resistance to wear and scratching, etc. In particular, the invention relates to universal material testers, especially those having replaceable test/measurement units such as scratch test units, load cells, hardness test units, optical heads for aligning or imaging, etc.

The invention will be further described with reference to specific drawings, which should not be construed as limiting the scope of the invention and are given only for illustrative purposes.

Figure 1:
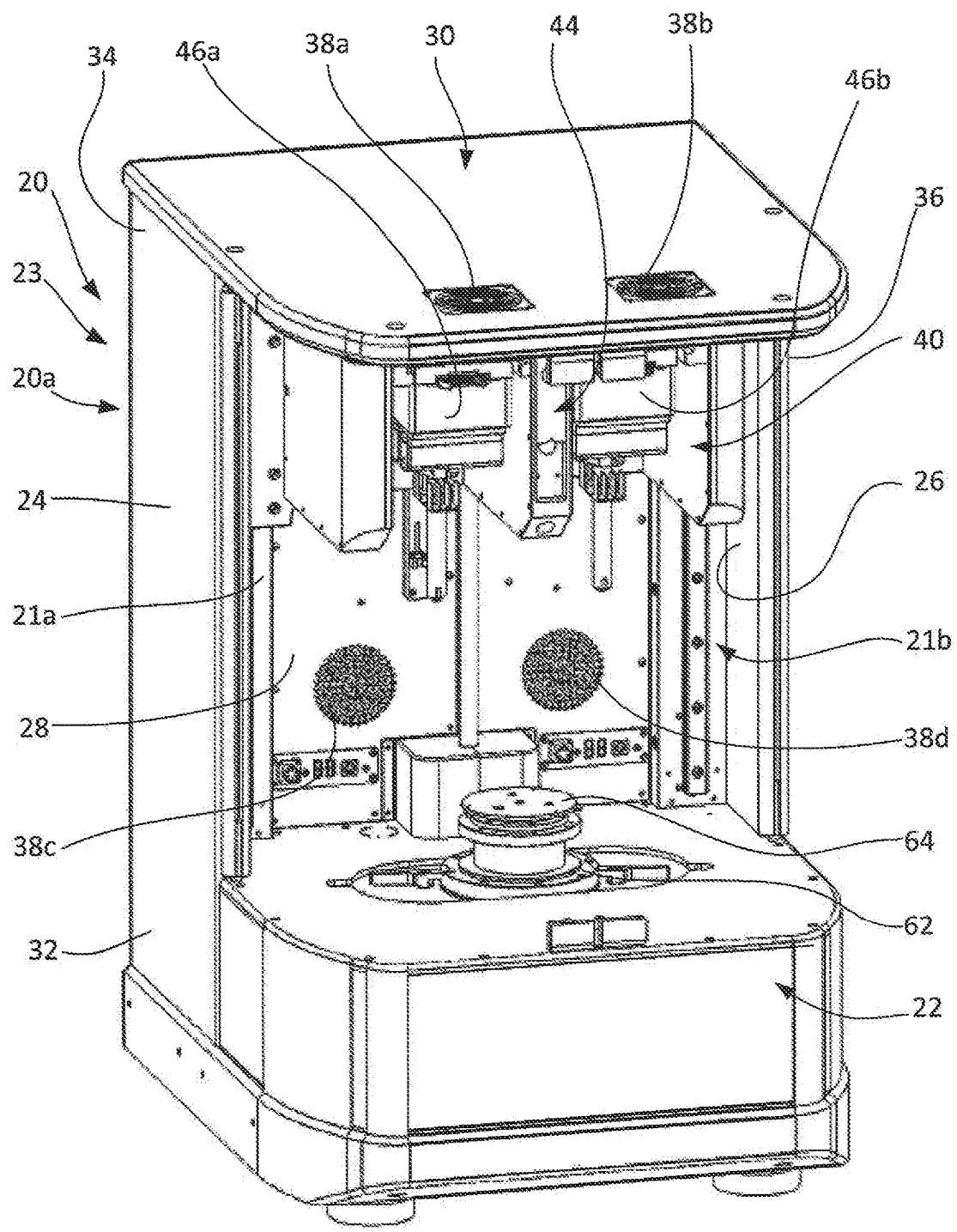
FIG. 1 is a three-dimensional view of a universal material tester of the present invention.

FIG. 1 is a three-dimensional view of a universal material tester 20 of the present invention. Structurally, the universal material tester of the present invention with two or more consecutively arranged test units (hereinafter referred to merely as a tester) has a frame 20a that consists of a base 22, a vertical guide support 23 in the form of a left sidewall 24, a right sidewall 26, a back support 28 in the form of a back wall, and a crosshead 30. Lower ends of the sidewalls (only lower end 32 of the left sidewalls is seen and designated in FIG. 1) are connected to the base 22. The upper ends 34 and 36 of the left and right sidewalls are interconnected by the crosshead 30.

In FIG. 1, reference numerals 38a, 38b, 38c, and 38d designate cooling fans used for cooling the structure and mechanisms of the tester during operation of the tester.

The tester 20 is provided with an upper carriage 40, which is located between the left sidewall 24 and the right sidewall 26 in the upper part of the tester 20 above the base 22.

The frame 20a has vertical guides 21a and 21b installed on the inner side of the left sidewall 24 and the inner side of the right sidewall 26, respectively. The vertical guides 21a and 21b extend in a vertical direction between the crosshead 30 and the base 22 and are intended for guiding the upper carriage 40 in a vertical direction parallel to the sidewalls towards and away from the base 22.

Figure 2:
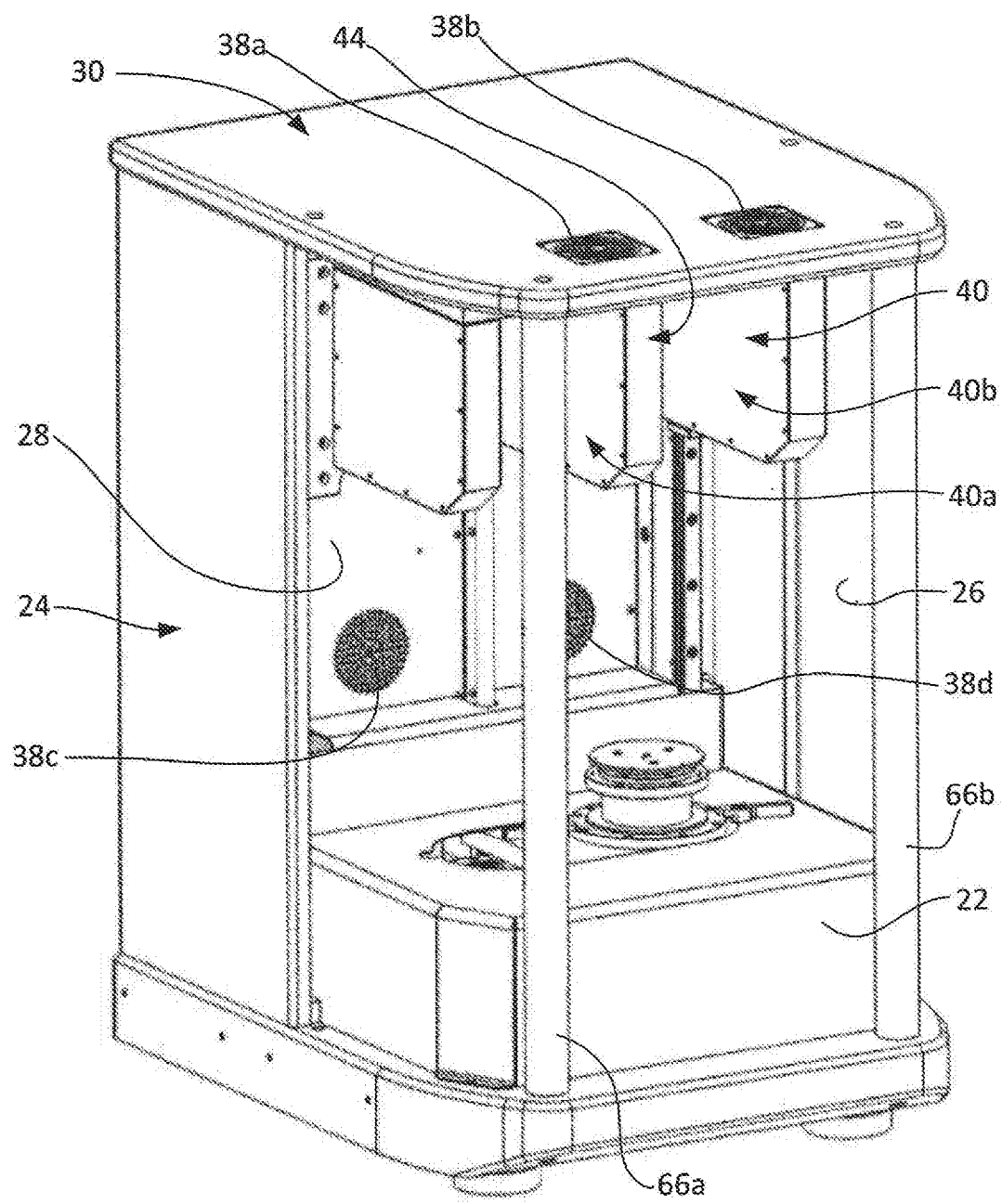
FIG. 2 is a three-dimensional view of the tester similar to FIG. 1 but with installation sockets without test units, which are to be installed and secured in these sockets.

The carriage 40 has at least two installation sockets 40a and 40b, which are shown in FIG. 2. FIG. 2 is a three-dimensional view of the tester similar to FIG. 1 but with installation sockets without test units, which are to be installed and secured in these sockets, as will be described later.

Figure 3:
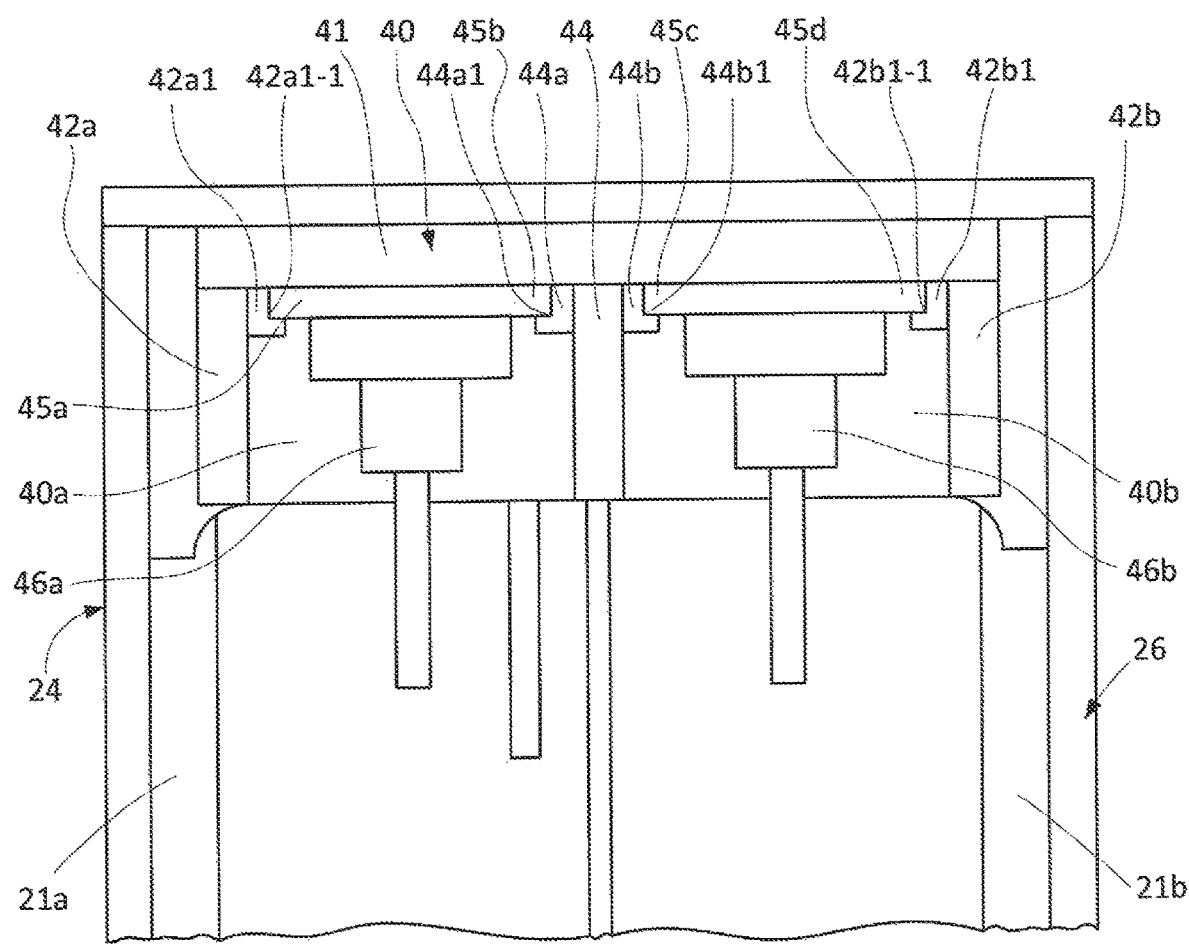
FIG. 3 is a front view of an upper carriage with two installation sockets.
Figure 4:
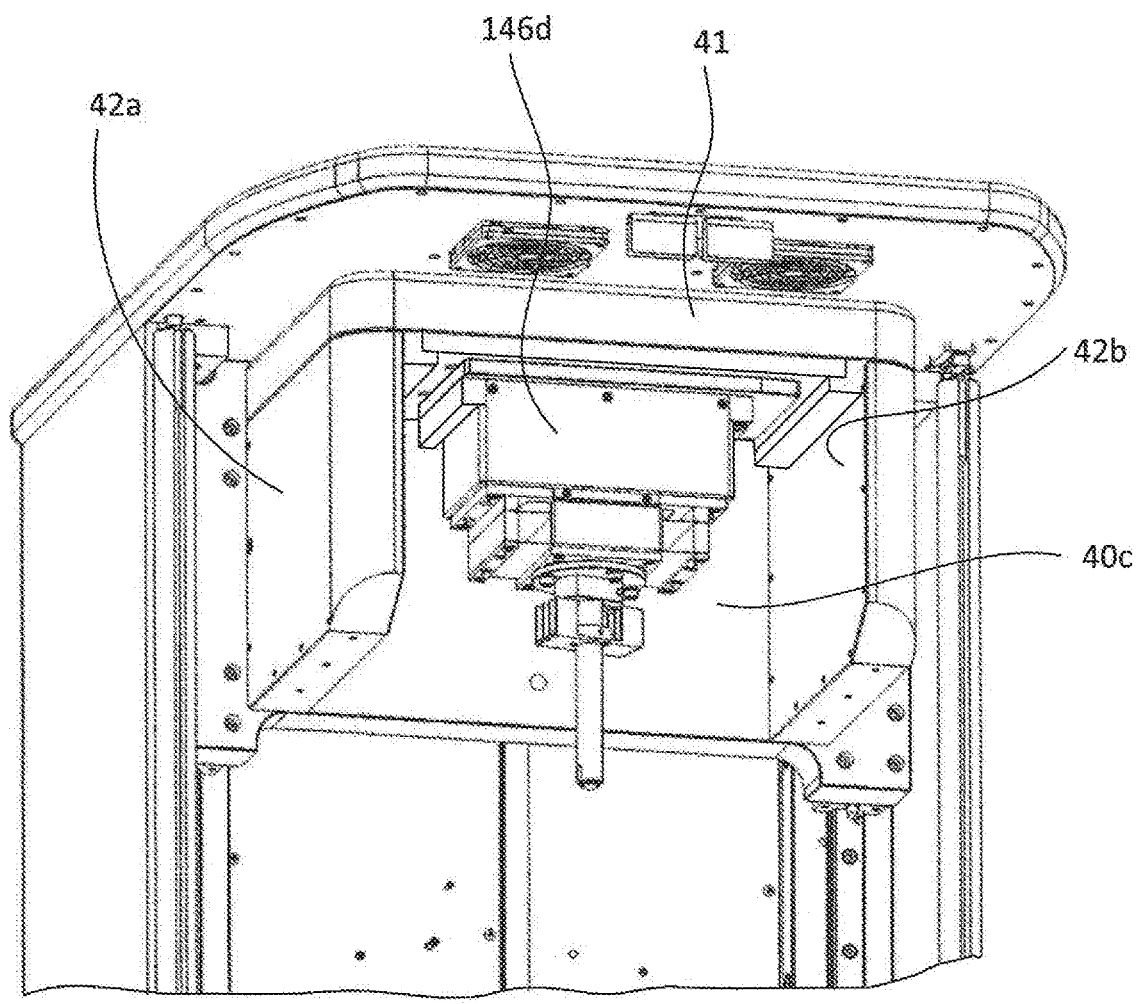
FIG. 4 is a three-dimensional view of an upper part of the tester.

As shown in FIG. 3, which is a front view of the carriage 40 with two installation sockets 40a and 40b, each of the two installation sockets 40a and 40b is defined by a left side plate 42a, a right side plate 42b of the upper carriage 40, an upper plate 41 (FIG. 3 and FIG. 4) and a removable partition 44 between the side plates 42a, 42b, so that upon removal of the removable partition 44, the number of the at least two installation sockets is reduced by one thus forming one wide installation socket 40c, which is shown in FIG. 4. FIG. 4 is a three-dimensional view of an upper part of the tester 20. It can be seen that the wide installation socket 40c is wider than each of the at least two installation sockets 40a and 40b and that at least one of at least two test units of the set of the test units (in this case a test unit 146d) is installable in the wide socket 40c.

Figure 5:
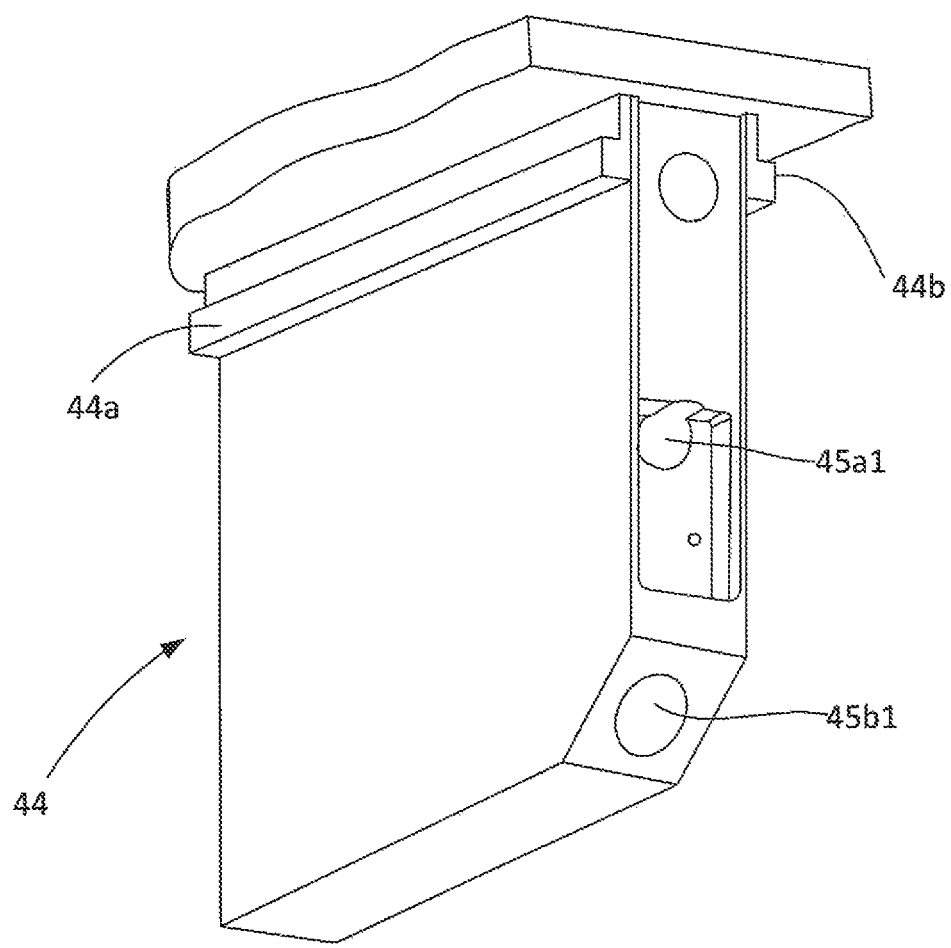
FIG. 5 is a three-dimensional view of a removable partition.

A three dimensional view of the removable partition 44 is shown in FIG. 5. The partition 44 is attached to the upper plate 41 (FIGS. 3 and 4), by a securing mechanism for securing the partition to the frame, in the illustrated case to the crosshead of the frame, e.g., by screws insertable into threaded holes (not shown) of the upper plate 41 and accessible through the notches 45a1 and 45b1 and vertical holes (not shown) formed in the body of the partition 44.

The side plates of the carriage 40 have guides extending in the horizontal direction. Thus, the left plate 42a of the carriage supports a left plate guide 42a1 and the right plate 42b supports a right plate guide 42b1 (FIG. 3).

The removable partition has a left partition guide 44a on a side of the partition facing the left plate guide 42a1 and a right partition guide 44b facing the right plate guide 44b1. The left partition guide 44a is arranged parallel and coplanar to the left plate guide 42a1, and the right partition guide 44b is arranged parallel and coplanar to the right plate guide 42b1.

In other words, the partition 44 has on each side a partition guide, which is neighboring to a facing plate guide. Thus the left partition guide 42a1 is neighboring to the facing left plate guide 42a1 of the carriage 40, and the right plate guide 44b1 is neighboring to the facing right plate guide 42b1.

The tester 20 is equipped with a set of test units insertable into and secured in the installation sockets.

An advantage of the apparatus and method of the present invention is a possibility of expanding dynamic range of measurements by using two or more test units, which are installed in series at one setting and can be used at sequential tests without replacement but with different measurement ranges. This broadens the measurement ranges of a specific test and compare and analyze the obtained data without loss of time which otherwise has to be spent on the tool replacement.

The test units are shown in FIGS. 1 and 3, where they are designated by reference numerals 46a and 46b. At least two of the test units of the set are identical in a function and application of test tools installed in these at least two of the test units but different in ranges measurement ranges and the characteristics of a material being tested.

Examples of interchangeable test units of which are identical in function but different in the measurement ranges are Nano Scratch Tester Head NSt-1 (Coating Thickness<1000 nm, Max Down Force 1000 mN), Micro Scratch Tester Head MSt-50 (Coating Thickness<5 microns, Max Down Force 50N), and Macro Scratch Tester Head HSt-200 (Coating Thickness>5 microns, Max Down Force 200N). These tester heads are used in their testers by Rtech Instruments Co., Inc., USA . . . . Alternatively, an interchangeable test unit insertable into an installation socket of the tester 20 may be represented by an optical profilometer used by Rtech Instruments. The profilometer that creates a 3D stitched image after the scratch automatically. The optical profilometer is specifically optimized for scratch test. The head allows measuring steep scratch slopes, transparent coatings (glass etc.) and measure roughness, volume wear, method of failure etc. with sub nm resolution. The profiler comes with five objective turret that allows mounting multiple magnification objective simultaneously. The profiler head has multiple imaging modes to effectively characterize any sample.

Figure 6A:
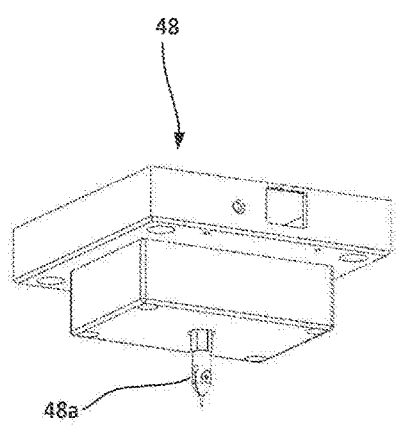
Figure 6B:
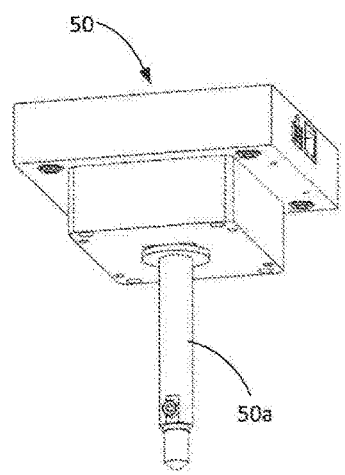
FIG. 6B illustrates a second scratch test unit with a second scratch probe.
Figure 6C:
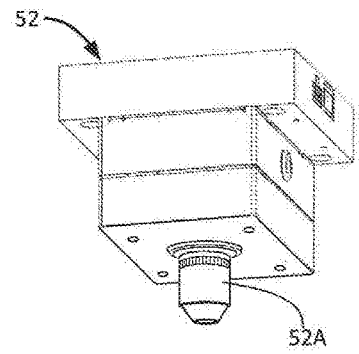

The tester 20 is provided with a set of test tools installable and securable in the test units for engaging a specimen of the test material being tested. Mechanisms of insertion of the test tools in the test units are identical and at least two of the test tools of the set are intended for testing the same properties of the test material but different measurement ranges of characteristics of the test material. Examples of test units with test tools inserted into the test units are shown in FIGS. 6A, 6B, 6C, where FIG. 6A illustrates a first scratch test unit 48 with a first scratch probe 48a, where FIG. 68 illustrates a second scratch test unit 50 with a second scratch probe 50a, and FIG. 6C shows an optical head 52 with an objective 52a.

Each test unit of the set is installable and securable in each installation socket by guiding and securing thereof between the left plate guide 44a1 and the left partition guide 44a band between the right partition guide 44b and the right plate guide 44b1, respectively. All test units of the set have identical means for insertion into the sockets. According to one aspect of the invention, the guides on the plates and the guides on the partitions have recesses, while the guide members on the test unit have projections, which are slidingly insertable into the recesses of the plates. More specifically, the left plate guide 42a1 has a recess 42a1-1. The right plate guide 42b1 has a recess 42b1-1. The left partition guide 44a has a recess 44a-1, and the right partition guide 44b has a recess 44b1. For insertion into the respective installation sockets, each test unit of the set has on each side a projection slidingly insertable into the respective recesses formed in the left plate guide and in the left partition guide of the recess. According to one aspect of the invention, for installation in the installation socket 40a, such projections are formed as flanges, such as a flange 45a insertable into the recess 42a1-1 and a flange 45b insertable into the recess 44a1. For installation in the installation socket 40b, the projections are formed as flanges, such as a flange 45c insertable into the recess 44b1 and a flange 45d insertable into the recess 42b1-1.

Upon insertion of the projections, i.e., flanged portion of a test unit, into the recesses of the side plates, the test unit can be secured between guides by a locking mechanism. An example of the locking mechanism may be comprised by a spring ball lock such as M6 Stainless Steel Spring Ball Plunger distributed by Cardepo. The spring ball plungers can be installed in the guides and respective dimples can be formed in the flanges.

Figure 7:
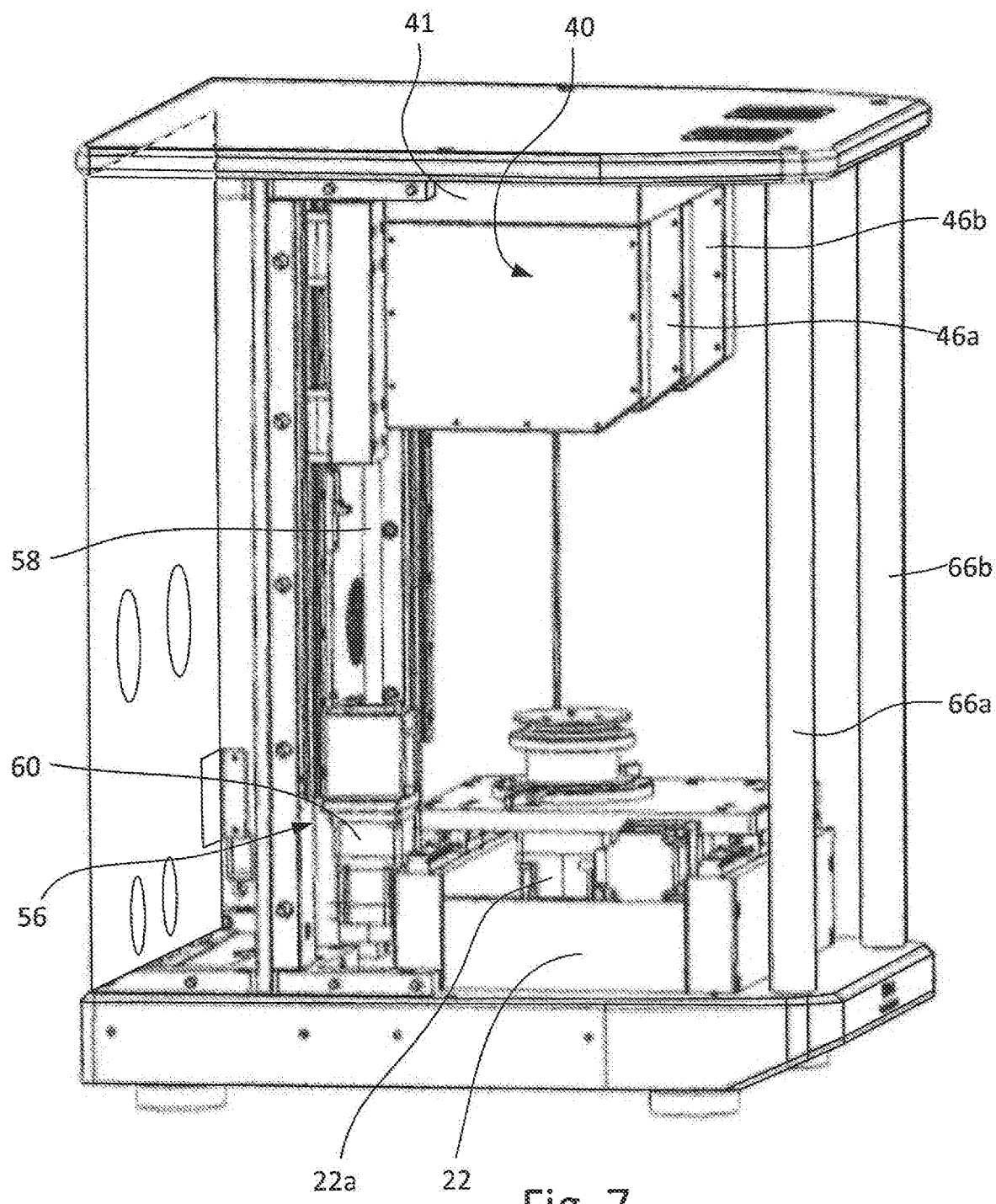
FIG. 7 is a view similar to FIG. 1 but illustrating positions of the lead screw and its drive.

A carriage drive mechanism 56 for driving the upper carriage 40 in the vertical direction is shown in FIG. 7 and is comprised of a vertical lead screw 58 and a lead screw dive motor 60 attached to the base and intended for rotating the lead screw 58. FIG. 7 is a view similar to FIG. 1 but illustrating positions of the lead screw and its drive. The lead screw converts its rotation into a linear vertical motion of the upper carriage 40, e.g., through engagement with a nut (not shown) installed the upper carriage 40.

A lower carriage 62 (FIG. 1) that supports a specimen table 64 for securing a specimen (not shown) of a material to be tested and lower carriage drive mechanism for driving the lower carriage at least in one direction in a horizontal plane are the same as in the aforementioned U.S. patent Ser. No. 10/132,733 and do not constitute an object of the present invention.

To improve rigidity of the frame 20a, the tester is provided with replaceable columns 66a and 66b that extend from the crosshead 30 to the base 22 (see FIGS. 2 and 7).

Figure 8:
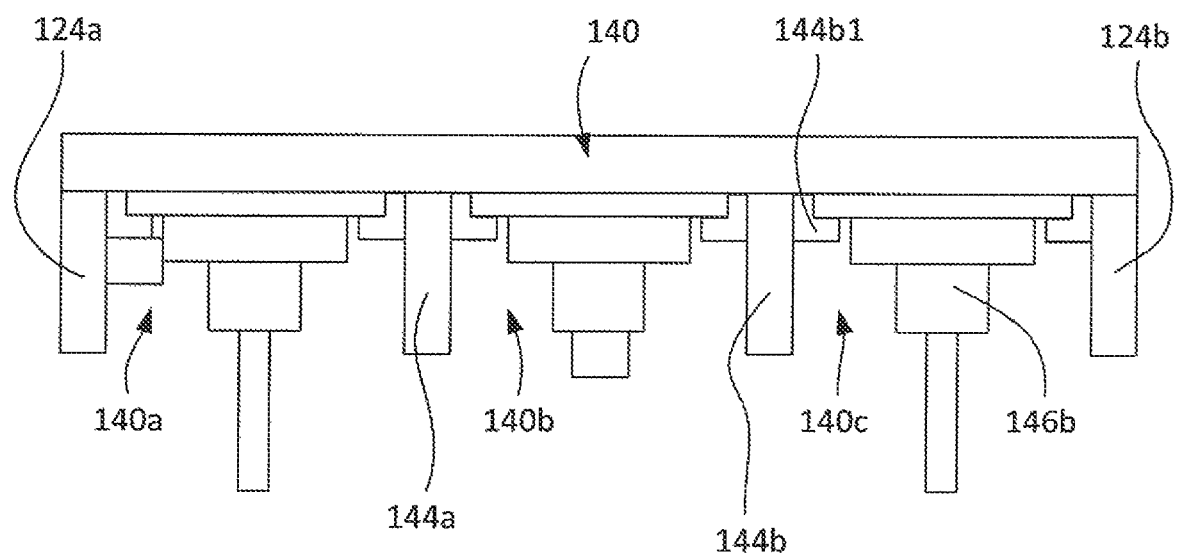
FIG. 8 is a modification of the tester of the invention more than two installation sockets in the upper carriage.

A modification with more than two installation sockets in a carriage 140 shown in FIG. 8. In this modification, the upper carriage has three installation sockets 140, 140b, and 140c formed between the side plates 124a and 124b by using two replaceable partitions 144a and 144b. In the case shown in FIG. 8, the partition 44b plays a role of the left plate and its guide 144b1 plays a role of the left guide for the test unit 146b installed in the installation socket 140c.

In FIG. 7, reference numeral 22a designates a lower carriage drive mechanism 22a for driving the lower carriage 62 in at least one linear direction or in rotation depending on the drive unit 22a of the modular sample stages interchangeably installable on the platform of the lower carriage as disclosed in U.S. patent Ser. No. 10/132,733.

The invention was shown and described with reference to specific modifications. It is, however, understood that these modification are given only as examples and that they in no way limit the scope of the application of the invention and that any changes and other modifications are possible within the scope of the attached patent claims. For example, the number of installation cells is not limited by two and three or more installations cells for setting in series more than two-test unit is possible. The test units may be used in combinations different from those illustrated and described. The upper carriage can be moved in the vertical direction by using a tooth rack and a gear instead of the lead screw and nut.

The invention claimed is:

1. A universal material tester comprising:
 a frame comprising a base, a vertical guide support having a lower end connected to the base and an upper end, and a crosshead, which is connected to the upper end of the vertical guide support;
 vertical guides, which are supported by the vertical guide support and extend in a vertical direction between the crosshead and the base;
 an upper carriage, which is guided along the vertical guides and comprises at least two installation sockets for installing and securing at least two test units of a set of test units, each of said at least two installation sockets being defined by a left plate of the carriage, a right plate of the carriage, and at least one partition between the left plate of the carriage and the right plate of the carriage;
 a drive mechanism for driving the upper carriage in said vertical direction;
 a set of test tools installable and securable in the test units of said set of test units for engaging a specimen of a test material, at least two of the test units of said set of test units being identical in a function and application of test tools installed in the at least two of the test units but different in measurement ranges of characteristics of a material being tested; and a lower carriage that supports a specimen table for securing the specimen of the material to be tested and a lower carriage drive mechanism for driving the lower carriage at least in one direction in a horizontal plane for positioning the specimen in alignment with the test tool being used, wherein the left plate of the carriage is provided with a left plate guide, the right plate of the carriage is provided with a right plate guide, the at least one partition has on each side a partition guide, which is neighboring to a facing left plate guide or a right plate guide, respectively; the at least two of the test units of said set of the test units being installable in the at least two installation sockets by guiding and securing them between the left plate guide and the partition guide, which is neighboring to the facing left plate guide, and between the right plate guide and the partition guide, which is neighboring to the facing right plate guide, respectively, and wherein the at least one partition is a removable partition between the left plate of the carriage and the right plate of the carriage, so that upon removal of the at least one removable partition the number of the at least two installation sockets of the set of the test units is reduced by one thus forming at least one wide installation socket, which is wider than each of said at least two installation sockets of said set of test units.

2. The universal material tester according to claim 1, wherein the at least one partition is a removable partition so that upon removal of the at least one removable partition the number of the at least two installation sockets of the set of the test units is reduced by one thus forming at least one wide installation socket, which is wider than each of said at least two installation sockets of said set of test units.

3. The universal material tester according to claim 2, wherein the left plate of the carriage is provided with a left plate guide, the right plate of the carriage is provided with a right plate guide, the at least one partition has on each side a partition guide, which is neighboring to a facing left plate guide or a right plate guide, respectively; the at least two of the test units of said set of the test units being installable in the at least two installation sockets by guiding and securing them between the left plate guide and the partition guide, which is neighboring to the facing left plate guide, and between the right plate guide and the partition guide, which is neighboring to the facing right plate guide, respectively.

4. The universal material tester according to claim 3, wherein the at least one removable partition is provided with a securing mechanism for securing the partition to the frame.

5. The universal material tester according to claim 3, wherein the test units are selected from the group consisting of a scratch test unit, a load measurement unit, a hardness measurement unit, and an imaging optical head.

6. The universal material tester according to claim 5, wherein the drive mechanism for driving the upper carriage in the vertical direction comprises a vertical lead screw and a drive motor attached to the base and intended for rotating the lead screw, the lead screw being engageable with the upper carriage for converting rotation of the lead screw into said movement of the upper carriage into the vertical direction.

7. The universal material tester according to claim 6, wherein the vertical guide support comprises a left sidewall and a right sidewall and the vertical guides comprise a left vertical guide that is supported by the left sidewall and the right vertical guide that is supported by the right sidewall.

8. The universal material tester according to claim 7, wherein the vertical frame is provided with removable vertical columns extending between the base and the crosshead.

9. A universal material tester comprising:

a frame comprising a base, a vertical guide support having a lower end connected to the base and an upper end, and a crosshead that is connected to the upper end of the guide support;

vertical guides extending in a vertical direction between the crosshead and the base;

an upper carriage, which is guided along the vertical guides in a vertical direction between the crosshead and the base and comprises: at least two installation sockets for installing and securing at least two test units of a set of test units, each of said at least two installation sockets being defined by a left plate of the carriage, a right plate of the carriage, and at least one removable partition between the left plate of the carriage, and the right plate of the carriage, so that upon removal of the at least one removable partition the number of the at least two installation sockets is reduced by one thus forming at least one wide installation socket, which is wider than each of said at least two installation sockets, at least one of said at least two test units being installable in the at least one wide socket;

a drive mechanism for driving the upper carriage in said vertical direction;

a set of test tools installable and securable in the test units for engaging a specimen of a test material, at least two of the test units of said set of test units being identical in a function and application of test tools installed in the at least two of the test units but different in measurement ranges of characteristics of a material being tested; and a lower carriage that supports a specimen table for securing the specimen of the material to be tested and a lower carriage drive mechanism for driving the lower carriage at least in one direction in a horizontal plane for positioning the specimen in alignment with the test tool being used.

10. The universal material tester according to claim 9, wherein the drive mechanism for driving the upper carriage in the vertical direction comprises a vertical lead screw and a drive motor attached to the base and intended for rotating the lead screw, the lead screw being engageable with the upper carriage for converting rotation of the lead screw into said movement of the upper carriage into the vertical direction.

11. The universal material tester according to claim 10, wherein the left plate of the carriage is provided with a left plate guide, the right plate of the carriage is provided with a right plate guide, the at least one removable partition has on each side a partition guide, which is neighboring to a facing left plate guide or a right plate guide, respectively; the at least two of the test units of said set of the test units being installable in the at least two installation sockets by guiding and securing them between the left plate guide and the partition guide, which is neighboring to the facing left plate guide, and between the right plate guide and the partition guide, which is neighboring to the facing right plate guide, respectively.

12. The universal material tester according to claim 11, wherein the set of test units comprises at least one wide test unit installable in the wide installation socket formed by removing the at least one removable partition, said wide test unit being installed in the wide installation socket by guiding thereof and securing between the left plate guide and the right plate guide, which remain in place after removal of the at least one removable partition.

13. The universal material tester according to claim 12, wherein the at least one removable partition is provided with a securing mechanism for securing the partition to the frame.

14. The universal material tester according to claim 12, wherein the frame is provided with removable vertical columns extending between the base and the crosshead.

15. The universal material tester according to claim 14, wherein the vertical guide support comprises a left sidewall and a right sidewall and the vertical guides comprise a left vertical guide that is supported by the left sidewall and the right vertical guide that is supported by the right sidewall.

16. The universal material tester according to claim 9, wherein the test units are selected from the group consisting of a scratch test unit, a load measurement unit, a hardness measurement unit, and an imaging head.

\* \* \* \* \*